United States Patent

Gans

[11] Patent Number: 5,940,167
[45] Date of Patent: Aug. 17, 1999

[54] PROCESS AND APPARATUS FOR DISPLAYING AN ANIMATED IMAGE

[76] Inventor: Richard Gans, 550 Amity Rd., Woodbridge, Conn. 06525

[21] Appl. No.: 08/812,490

[22] Filed: Mar. 6, 1997

[51] Int. Cl.$^6$ .............................. G03B 21/32; G03B 19/18
[52] U.S. Cl. ............................... 352/43; 352/47; 352/85; 352/87; 352/89
[58] Field of Search .................................. 352/43, 47, 48, 352/52, 54, 85, 86, 87, 89; 353/28

[56] References Cited

U.S. PATENT DOCUMENTS

| | | | |
|---|---|---|---|
| 1,653,180 | 12/1927 | Jalbert | 353/28 |
| 3,053,144 | 9/1962 | Harries et al. | 312/86 |
| 3,973,840 | 8/1976 | Jacobs et al. | 352/86 |
| 4,509,835 | 4/1985 | Adler | 352/43 |
| 4,978,216 | 12/1990 | Liljegren et al. | 353/28 |
| 5,159,362 | 10/1992 | Monroe et al. | 312/85 |
| 5,221,937 | 6/1993 | Machtig | 353/28 |

FOREIGN PATENT DOCUMENTS

0095538  4/1991  Japan .

*Primary Examiner*—Eddie C. Lee
*Attorney, Agent, or Firm*—Bachman & Lapointe, P.C.

[57] ABSTRACT

A process for displaying an animated likeness of the face of a character, includes the steps of (a) providing a face screen having a three-dimensional representation of the face of the character; (b) making a projectable image of the face of the character with an image recorder while projecting the image on the face screen with a projector; (c) obtaining a presentation registration of the image and the face screen through a process selected from the group consisting of (i) altering the projectable image, (ii) adjusting at least one component of face screen position, image recording means position, projector position, focal length and lighting while making the projectable image, and (iii) combinations thereof; and (d) subsequently projecting the image on the face screen at the presentation registration whereby an animated likeness of the face of the individual is presented. An apparatus for carrying out the process is also provided.

33 Claims, 5 Drawing Sheets

PROCESS AND APPARATUS FOR DISPLAYING AN ANIMATED IMAGE

BACKGROUND OF THE INVENTION

The invention relates to a process and apparatus for displaying an animated image, especially an animated likeness of the face of an individual, so as to provide an animated image which is strikingly realistic and life-like.

A number of disclosures have been made with respect to attempts to reproduce life-like images of an animated individual. Examples include U.S. Pat. No. 5,221,937 to Machtig, U.S. Pat. No. 3,973,840 to Jacobs et al., U.S. Pat. No. 3,053,144 to Harries et al. and U.S. Pat. No. 1,653,180 to Jalbert. The above-mentioned patents provide mannequins wherein an image is rear-projected onto contoured screens so as to simulate the likeness of a desired individual.

It is also known to project an image onto a contoured screen from the front of the screen, but conventional front placement of a projector blocks the view of on-lookers and is not practical. Attempts to solve this problem include placing the projector above or below the contoured screen and angling the projector onto the contoured screen. However, this process leads to misregistration such as the elongation of features upon the projection screen.

Rear projection methods such as those discussed in the patents mentioned above include the use of screens which are at least partially generic. For example, Machtig '937 calls for rear projection facial screens having rounded, sloping chins which are of a generic quality.

These and other problems with both front and rear projected images result in animated displays which are not as realistic or life-like, and in the case of a living nonfictional character, as clone-like as is desirable. Thus, the need remains for a process and apparatus for displaying an animated likeness of the face of an individual which is realistic, life-like and/or clone-like.

It is therefore the primary object of the present invention to provide a process for displaying an animated likeness of the face of an individual or character wherein a three-dimensional face screen is provided which accurately depicts or clones the face of the individual or character, and wherein a projectable image of the individual or character is front projected on the face screen in an arrangement which reduces image misregistration and other problems while providing a clear view of the face screen.

It is a further object of the present invention to provide a process for displaying an animated likeness or image which avoids the need for generic features.

It is a still further object of the present invention to provide a process for displaying an animated likeness or image wherein environmental conditions such as light washout and intensity fall-off are reduced or eliminated.

It is another object of the present invention to provide an apparatus for displaying an animated likeness or image of the face of an individual which is simple to produce, and which is effective at reproducing clone-like or life-like animated images of a character or individual.

Other objects and advantages appear hereinbelow.

SUMMARY OF THE INVENTION

In accordance with the present invention, the foregoing objects and advantages are readily attained.

According to the invention, a process for displaying an animated likeness of the face of a character is provided, which process comprises the steps of (a) providing a face screen comprising a three-dimensional representation of the face of the character; (b) making a projectable image of the face of the character with an image recording means while projecting the image on the face screen with a projector; (c) obtaining a presentation registration of the image and the face screen through a process selected from the group consisting of (i) altering the projectable image, (ii) adjusting at least one component of face screen position, image recording means position, projector position, focal length and lighting while making the projectable image, and (iii) combinations thereof; and (d) subsequently projecting the image on the face screen in the presentation registration whereby an animated likeness of the face of the individual is presented.

In further accordance with the present invention, an apparatus is provided for displaying an animated likeness of the face of a character, which apparatus comprises a face screen having a front surface and a three dimensional representation of the face of the character on the front surface; a projectable image of the character adapted for viewing on the face screen; and projector means positioned relative to the face screen for projecting the image onto the face screen.

In accordance with a further preferred alternative embodiment of the invention, an additional screen is positioned relative to the face screen and an additional image is displayed on the additional screen for providing visual support to the presentation of the animated likeness of the individual.

Still further in accordance with preferred alternative embodiments of the process and apparatus of the present invention, the face screen and other elements of the present invention are preferably provided within an enclosure so as to conceal elements such as the projector, and to enhance the image displayed upon the face screen, for example by reducing or eliminating light washout.

BRIEF DESCRIPTION OF THE DRAWINGS

A detailed description of preferred embodiments of the present invention follows, with reference to the attached drawings, wherein.

DETAILED DESCRIPTION

The invention relates to a process and apparatus for displaying an image, preferably an animated image, of an individual or character wherein extraordinarily life-like or clone-like animated images are displayed on a three dimensional face screen which is a representation of the face of the individual or character, which process and apparatus are useful for providing displays in numerous fields including entertainment, education, information, communication, security and the like.

According to the invention, a three-dimensional face screen is prepared based upon an imprint of the face of a living actor, or is modeled to illustrate a desired character which may be a caricature of a known individual or any other human, animal or otherwise animated character, fictional or non-fictional. A projectable image is then prepared and modified as necessary in accordance with the invention to provide a presentation registration of the image and face screen for extraordinarily life-like display in an environment according to the invention wherein adverse effects such as image misregistration due to keystoning and other factors, as well as light wash out are avoided, all as will be discussed below.

Figure 1:
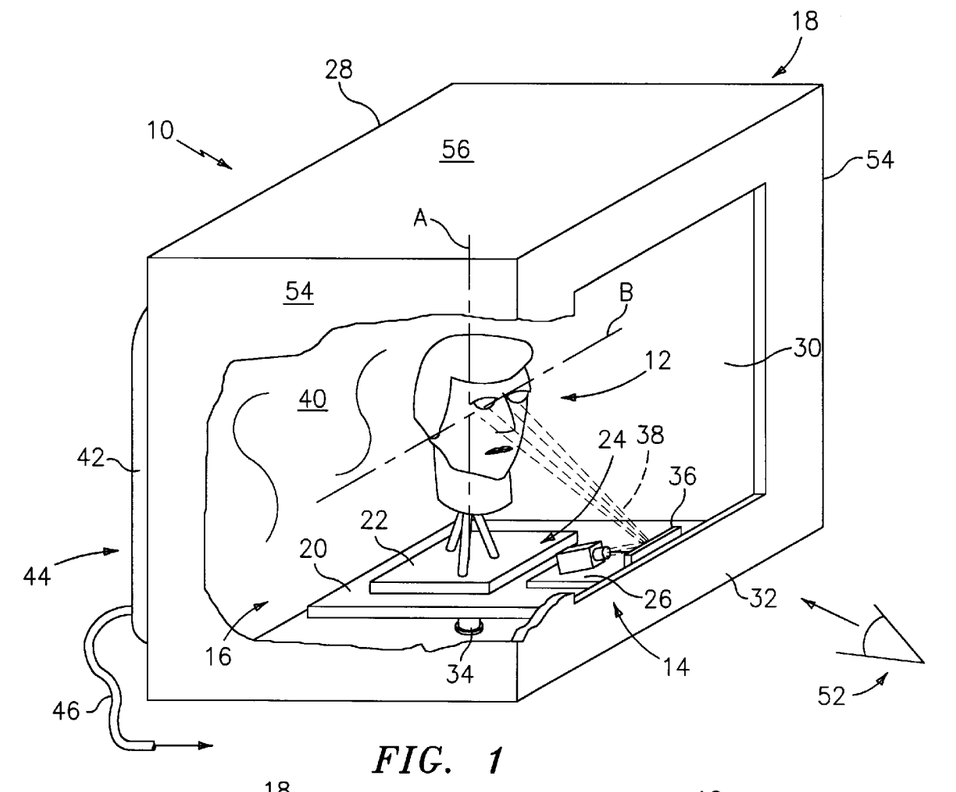
FIG. 1 is a partially cut-away perspective view of an apparatus according to the present invention.

FIG. 1 illustrates a perspective and partially sectioned away view of an apparatus in accordance with the present invention, which is generally referred to herein by reference numeral 10. According to the invention, apparatus includes a face screen 12 and a projector 14 which are preferably positioned on a stage assembly 16 within an enclosure 18 whereby an animated projectable image of an individual can be projected upon face screen 12 so as to provide a remarkably life-like animated likeness of the individual.

In accordance with the invention, face screen 12 is preferably a three dimensional screen such as a vacuum-formed screen formed from a cast taken directly, preferably as an imprint, from the individual whose likeness is to be created. Such a process for creating face screen 12, known as life casting, advantageously provides face screen 12 with accurate dimensional features upon which a projectable image can readily be projected. Life casting will be further discussed below. Alternatively, face screen 12 may be hand or otherwise molded into the form of a desired character such as a caricature, fictional being, living or deceased historical individual, animal or other animate or inanimate item to be displayed. The individual, character, caricature and the like as set forth above are collectively referred to herein as a character.

In accordance with the invention, stage assembly 16 preferably includes a main stage 20 and a face screen stage 22 which is movably mounted to main stage 20 and which supports face screen 12, for example through tripod structure 24 shown schematically in FIG. 1. Stage assembly 16 also preferably further includes a projector stage 26 which itself is movably mounted to main stage 20 and which supports projector 14. The provision of main stage 20, face screen stage 22 and projector stage 26 serves desirably to provide adjustability of face screen 12 relative to projector 14 and vice versa, if desired, as well as combined movement of face screen 12 and projector 14 which is advantageous so as to provide simulation of natural movement of face screen 12 while maintaining projector 14 in a proper alignment with face screen 12 during such movement.

It should be noted that although elements of stage assembly 16 are referred to herein as stages and shown as substantially flat supporting members, any structure suitable for supporting the desired elements is suitable as any one or more of stages 20, 22 and 26 in accordance with the invention, and such structures need not have any substantially flat surface whatsoever.

Enclosure 18 is preferably any suitable structure such as box 28 shown in FIG. 1 which defines a substantially enclosed internal area and which has an opening 30, preferably arranged at one sidewall of box 28 as shown. Opening 30 may suitably be defined in box 28 by a lip member or front wall portion 32 which preferably extends along at least a portion of opening 30 for reasons which will be discussed below. Face screen 12, projector 14 and stage assembly 16 are all preferably positioned within box 28 so as to conceal certain elements from viewing while allowing face screen 12 to be viewed through opening 30, and further to reduce problems such as reduction in image quality due to light wash out of image or projection fall off due to viewing from an extreme angle.

It should be noted that box 28 including lip member 32 could be adapted to provide additional props or setting for the intended display. Thus, lip member 32 could alternatively be any structure suitable for concealing projector 14 as desired, such as one or more stage props or other fixed or moveable structure suitable for obstructing line of sight to a portion of the interior of box 28.

Main stage 20 is preferably movably mounted within box 28, preferably for rotation around vertical axis A (see FIG. 1) and also for pivot or rotation around substantially horizontal axis B (also see FIG. 1). The mounting of main stage 20 for movement with respect to axes A, B as discussed advantageously provides for combined movement of face screen 12 and projector 14 which does not interfere with proper alignment of projector 14 and face screen 12 whereby natural head movement can be simulated while projecting on face screen 12. The mounting of main stage 20 within box 28 is illustrated schematically by connection 34. Connection 34 could suitably be a panning tilting tripod head or any other structure. Numerous mechanical means for movably positioning main stage 20 relative to box 28 would be readily apparent to a person of ordinary skill in the art upon consideration of the present disclosure. Mechanical structure such as connection 34 for providing the desired movement of main stage 20 relative to box 28 is desirable for use in accordance with the present invention. Thus, movement such as left to right movement of face screen 12 can be provided to simulate eye contact with a viewing audience.

It is also preferable that stage assembly 16 be provided such that face screen stage 22 is adjustable relative to main stage 20, and also such that projector stage 26 is adjustable relative to main stage 20. This adjustable mounting of face screen stage 22 and projector stage 26 advantageously allows for adjustments and fine-tuning of the position of projector 14 relative to face screen 12 so as to provide the desired life-like or clone-like image in a properly adjusted presentation registration. A preferred embodiment of suitable structure for stage assembly 16 is discussed below in connection with FIG. 7. As with the mounting of main stage 20, however, any suitable structure, numerous variations of which would be readily apparent to the person of ordinary skill in the art, could be used to adjustably mount face screen stage 22 and projector stage 26 to main stage 20.

Still referring to FIG. 1, projector 14 may suitably be angled with respect to one or more mirrors or other reflective elements so as to define a reflected projector path which allows for a relatively small angle of projection without positioning projector 14 at a large distance from face screen 12 and further without obstructing viewing of face screen 12. In the embodiment illustrated, projector 14 is positioned so as to be angled substantially away from face screen 12, and a reflective element such as mirror 36 is positioned, preferably within box 28 behind lip member 32, so as to reflect an image from projector 14 onto face screen 12, thereby providing a relatively short focal length so as to reduce or minimize the space required for apparatus 10, and further providing a decreased angle of projection which significantly minimizes or reduces the effects of image misregistration. As stated above, one or more mirrors 36 could be used according to the invention to shorten the distance between projector 14 and face screen 12 at a particular angle of projector 14 to face screen 12.

Mirror 36 is preferably adjustably mounted with respect to main stage 20, for example to projector stage 26, so as to further allow for movement of stage assembly 16 including face screen 12 and projector 14 without interfering with the projector path, schematically illustrated at 38, from projector 14 to face screen 12.

In further accordance with the present invention, an additional screen 40 may be provided as shown in FIG. 1 so that an additional image, preferably an additional animated image, can be projected onto or otherwise displayed relative to face screen 12 in a synchronous manner so as to support, enhance or coincide with the presentation on face screen 12. Additional screen 40 may be positioned within box 28 and behind face screen 12 as shown, or may be positioned side-by-side or in front of face screen 12 within box 28 or exterior to box 28, in a supporting position as will be further discussed below. In this way, advantageously, the informational, educational or other value of display from apparatus 10 can be enhanced by providing images which support narration by the animated image displayed on face screen 12 in a position readily visible to viewers of the display on the face screen 12. FIG. 1 shows additional screen 40 as a conventional video monitor 42 which is mounted or abutted to a rear portion 44 of box 28. This configuration conveniently allows for connection of video monitor 42, for example through video cable 46, to a source of the desired animated image to be displayed on additional screen 40. In conjunction with position of projection and additional screen 40, projection for video monitor 42 is referred to and described herein as being from within additional screen 40.

Figure 2:
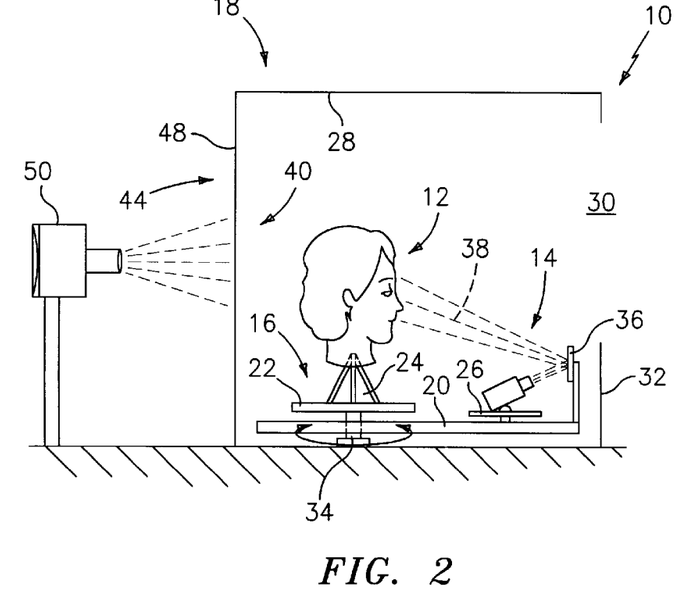
FIG. 2 is a side schematic view of another embodiment of an apparatus according to the present invention.

Alternatively, and referring to FIG. 2, additional screen 40 may be a rear-projected or back lit substantially flat screen or translite which may be incorporated into backwall 48 of box 28 or which may be positioned within box 28, as desired. In accordance with this embodiment of the invention, an additional projector 50 is preferably provided for rear-projecting the desired additional image upon additional screen 40 as desired. In the embodiment of FIG. 2, additional projector 50 is mounted directly behind box 28. Alternatively, additional screen 40 and additional projector 50 can both be mounted within box 28 if desired. Further, when using a translite as additional screen 40, no additional projectable image is needed, only a light source for illuminating the translite which incorporates the desired additional image. It should also be noted that an additional image could be provided by highlighting a physical object, which could be a feature of the character being displayed or any other supporting exhibit, positioned within or outside of box 28 for supplementing display on face screen 12. This may be accomplished for example using a pinlight or other light source.

It should be noted that additional screen 40 as set forth above could advantageously be positioned within box 28 alongside face screen 12, and could also be projected onto a substantially translucent or transparent screen (not shown), for example a glass screen, positioned in front of face screen 12 and using a technique known to those skilled in the art as Pepper's Ghost so as to provide a transparent image superimposed in front of face screen 12. Positioning additional screen 40 relative to face screen 12 as described above advantageously provides support to or background for the image projected on face screen 12 as desired.

In accordance with the invention, face screen 12 is preferably angled slightly toward projector 14, and projector 14 is preferably positioned either above or below face screen 12, within box 28. In this way, the angle of planar portions of face screen 12 with respect to projector path 38 is defined at or as close as possible to substantially perpendicular so as to reduce keystoning.

As set forth above, image misregistration problems are thus reduced according to the present invention by angling face screen 12 toward projector 14 as shown for example in FIG. 1. In accordance with the invention, it is preferred that face screen 12 of the configuration of FIG. 1 be positioned slightly above the viewing level or expected viewing level of persons viewing face screen 12. This viewing level is shown schematically in FIG. 1 at reference numeral 52. It should of course be noted that projector 14 and mirror 36 could be positioned within the upper portion of box 28, with face screen 12 angled slightly upward toward projector 14, and in this embodiment face screen 12 would preferably be positioned slightly below expected viewing level 52 so as to maintain eye contact with viewers and, thereby, to further enhance the realism and clone-like or life-like quality of the simulated image.

As shown in FIGS. 1 and 2, enclosure 18 may be in the form of box 28 having sidewalls 54 and top wall 56, preferably a portion of a front wall such as lip member 32, and preferably some structure defining a backwall of the enclosure. This backwall, if desired, may be formed by monitor 42 (see FIG. 1), by additional screen 40 (see FIG. 2) or by a solid structure or backwall 48 in which case additional screen 40 or monitor 42, if desired, could be positioned within the enclosure, and positioned as desired relative to face screen 12. Further, although enclosure 18 is shown in the drawings as box 28, a rounded or non-square enclosure would be equally suitable according to the invention, as would other structure or environmental controls for providing a darkened viewing area at least around face screen 12. Further, enclosure 18 could be extended around viewers so as to provide an enclosed viewing area such as a pod, booth, tent or kiosk, if desired.

Figure 3:
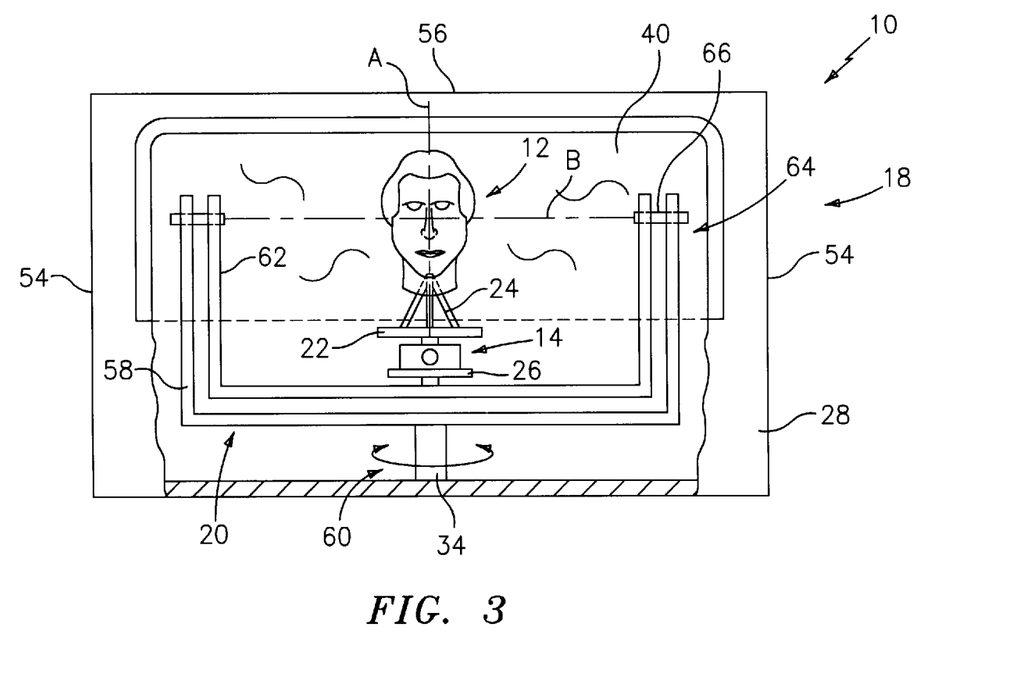
FIG. 3 is a front, partially sectioned away and partially schematic view of a further alternative embodiment of the present invention.
Figure 4:
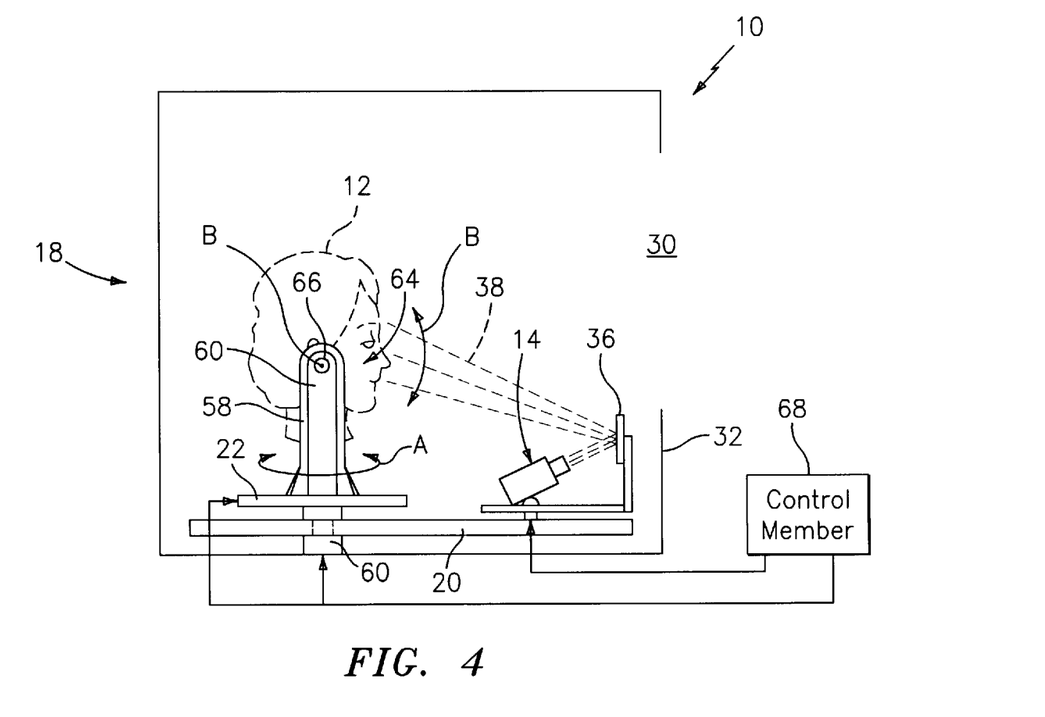
FIG. 4 is a side schematic view of still another alternative embodiment of the present invention.
Figure 4A:
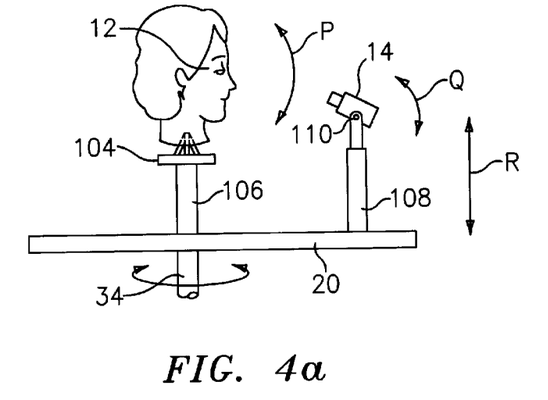
FIG. 4a is a side view of another alternative embodiment of the present invention.

As set forth above, it is desirable to provide main stage 20 movably mounted relative to enclosure 18 or box 28 for at least partial rotation around vertical axis A and further for at least partial pivot around horizontal axis B. As shown in FIG. 1, axes A, B are preferably positioned so as to provide movement of face screen 12 which approximates the natural movements of an actor. Referring to FIGS. 3, 4 and 4a, schematic embodiments for providing such motion are illustrated.

FIG. 3 shows a partially sectioned away view of an embodiment wherein main stage 20 comprises an outer bracket portion 58 rotatably mounted within box 28 through structure 60. Main stage 20 further includes an inner bracket portion 62 pivotably mounted to outer bracket portion 58, and face screen stage 22 and projector stage 26 are preferably mounted through main stage 20 to inner bracket portion 62. As shown, outer bracket portion 58 and inner bracket portion 62 may each suitably have upstanding portions indicated generally at 64, and pivotable connection structure 66 is provided for pivotably connecting upstanding portions 64 so as to provide pivot around axis B as desired. Structure 60 may be a simple axle or turntable structure for rotatably mounting outer bracket portion 58 and defining axis A for at least partial rotation as desired.

To further simulate natural and realistic head movements, structure 60 is preferably positioned so as to define axis A passing through the head perimeter defined by face screen 12. FIG. 4 is a side schematic view of the embodiment of FIG. 3 and shows outer bracket portion 58 and inner bracket portion 62 with face screen 12 in phantom so as to further illustrate the operation thereof. As shown, inner bracket portion 62 in the embodiment of FIGS. 3 and 4 can pivot around pivot structure 66 as shown by arrow A so as to provide a nodding motion of face screen 12 as indicated by arrow B. Pivot structure 66 is preferably positioned so as to define axis B passing through or directly below the head perimeter defined by face screen 12. Still referring to FIG. 4, movement around axes A, B may be generated by any suitable motive means (not illustrated) such as electric motor(s), pneumatics and the like which may suitably be operated by a control member 68 operatively connected to control movement around axis A and axis B in synchronization with the image projected by projector 14.

Any suitable control member 68 such as a personal computer, work station, dedicated command processor and the like may suitably be used as control member 68. It should also be noted that control member 68 could also be provided with hardware and/or software such as MIDI control for running various additional imaging routines and the like.

Referring now to FIG. 4a, an alternative mounting of face screen 12 and projector 14 is provided for simulating natural head movements around axis A and axis B in synchronization with the image projected by projector 14. As shown, main stage 20 may be mounted for rotation at structure 34 so as to provide rotation around a substantially vertical axis of face screen 12 in registry with projector 14. Furthermore, face screen 12 may suitably be mounted through a pivot structure 104 to a stand 106 preferably mounted to main stage 20. Pivot structure 104 suitably allows for pivot of face screen 12 as illustrated by arrow P in the drawing. Furthermore, projector 14 may also advantageously be mounted to main stage 20 through a telescoping support 108 connected to projector 14 through another pivotable connection 110 so that projector 14 can be pivoted around structure 110 as shown by arrow Q, and projector 14 can be raised and lowered by telescoping shaft 108 as shown by arrow R. Of course, and as set forth above, any other structure known to a person of ordinary skill in the art could suitably be used to provide for pivot or rotation of face screen 12 around vertical and horizontal axes while maintaining the presentation registration between projector 14 and face screen 12 as desired in accordance with the present invention.

Figure 5:
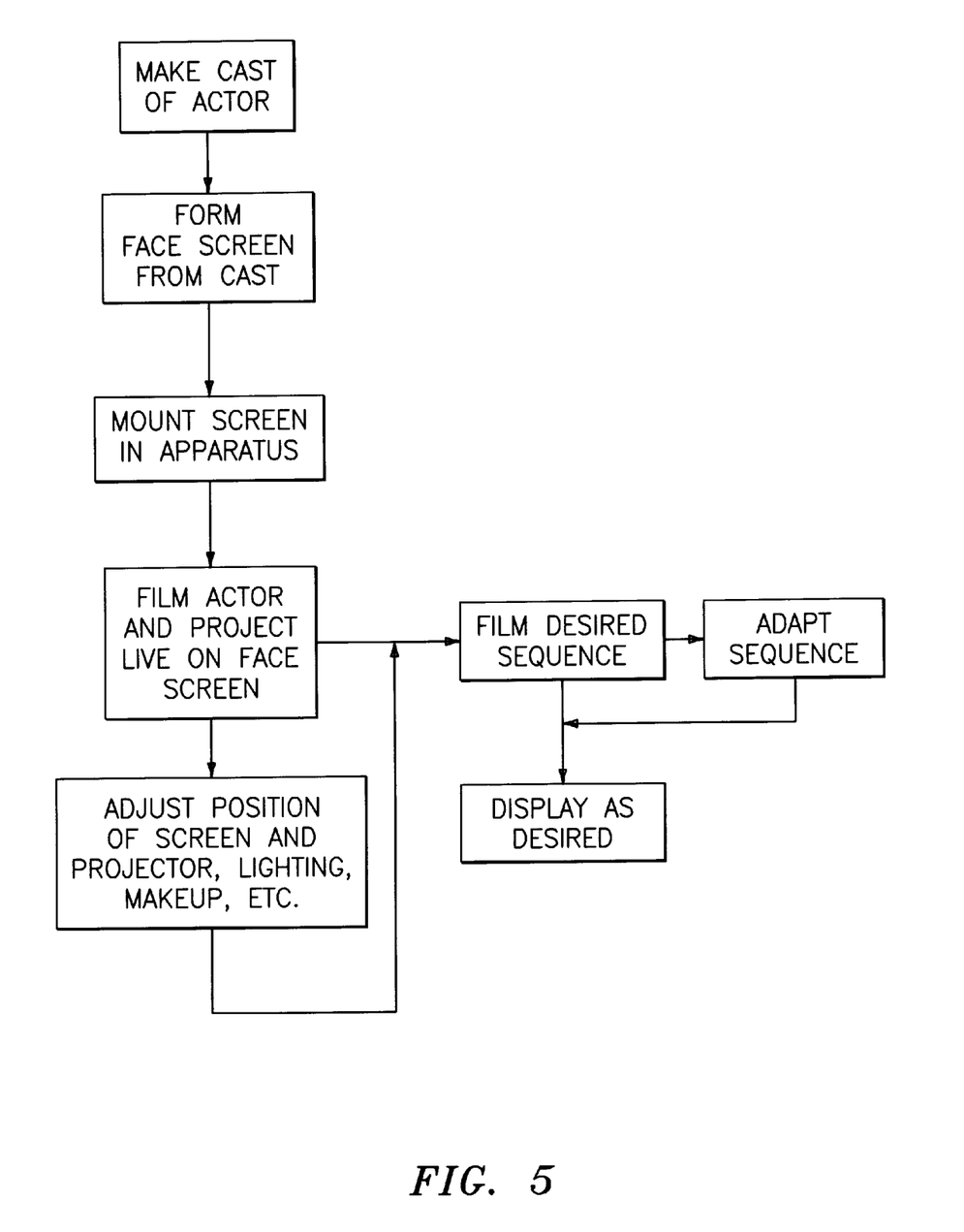
FIG. 5 is a flow chart illustrating the process for displaying an animated likeness in accordance with the present invention.

Referring to FIG. 5, a method for creating and displaying animated images in accordance with the invention is further discussed below preferably for use when a living individual is to be depicted. In accordance with the invention, the method for display begins with preparation of a suitable face screen 12 from the actor or actress to be depicted in the animated images.

An exact impression or mold of an actor's face is made using, preferably, alginate with strips of plaster coated gauze so as to form a mold, from which is made a positive, for example a plaster positive. This process is known as life casting. A vacuum form is then made from the positive, and this vacuum form, which is based upon the face of the individual, serves as face screen 12. Some tooling of the positive before vacuum forming may be desirable, and may serve to provide a more suitable face screen 12. Since face screen 12 is preferably to be used with front projection, many registration problems experienced with rear projection systems are overcome and/or avoided.

According to the invention, a latex coating is preferably applied to the plastic vacuum form face screen. The latex may be tinted so as to accommodate different flesh tones, if desired. Latex is advantageous as a coating since the material is light absorbing and, when projected upon, more accurately resembles the fleshy texture of skin. Such latex coating cannot be utilized in rear projection systems without experiencing additional difficulty. Of course, other flesh simulating coatings may be applied.

Alternatively, face screen 12 may be sculpted or otherwise provided, for example if a fictional or non-living character is to be displayed.

Face screen 12, prepared as above, is mounted in apparatus 10, and an image recording device such as a camera (not shown) is used to film the actor. This may suitably be accomplished with the actor in a head brace so as to minimize head movements, and is preferably done with a live feed to projector 14 so as to project images from the camera to projector 14 and onto face screen 12 during filming. While projecting live, adjustments can be made to one or more of position of face screen 12 and/or projector 14, camera or projector focal length, lighting, make-up on actor or face screen 12, and various other parameters. When all desired adjustments have been made so as to provide a desired adjusted presentation orientation of face screen 12, projector 14, actor and camera, lighting, etc., the desired sequence is filmed and stored through any conventional means such as video tape, electronic means and the like. The stored animated sequence may also be adapted through various editing and other procedures as discussed below, so as to provide the desired projection registration of the sequence or image with face screen 12. The stored animated sequence can then be displayed on face screen 12 at the presentation registration upon command, for example entered through control member 68 (FIG. 4) by a display operator or potential viewer or the like. The desired presentation registration is of course preferably an accurate registration between the projected image and face screen 12.

Figure 8:
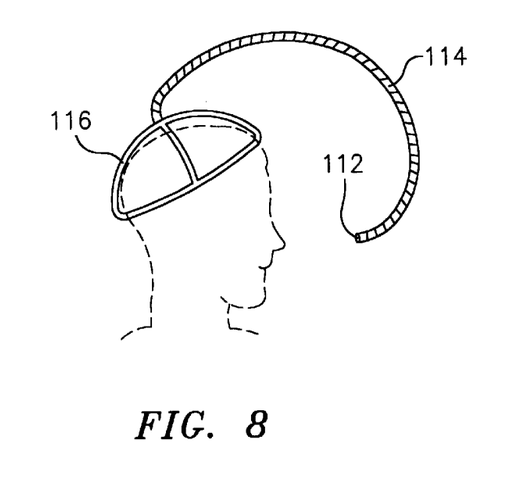
FIG. 8 is a schematic view of an alternative filming method according to the invention.

As set forth above, the filming step can be carried out with the actor in a head brace to minimize head movements. Alternatively, and referring to FIG. 8, the camera for filming the actor may be supported from the head of the actor during filming so as to follow the natural movements of the actor and thereby obviate the need for head braces and the like which may impair the natural acting ability of the person being filmed. Referring to FIG. 8, this may be carried out by using a structure such as, for example, a video camera lens 112 mounted to a semi-flexible arm 114 which is connected to head-mounting structure 116 such as a cap or the like. Components of this structure are known to a person of ordinary skill in the art for creating a light-weight device which can readily be worn by an actor during filming so as to provide video footage while allowing movement of the actor, yet without adversely affecting registration between the camera and actor, or between the image and face screen.

Alternatively, computer animation software and/or hardware or other animation techniques could be used to create and record the projectable image for example when a living actor is not available for filming. In either case, the image or video so created is preferably tailored or adapted according to the invention to enhance the clone-like or life-like nature of the image when front projected on three dimensional face screen 12 in accordance with the invention.

As set forth above, control member 68 can be used to actuate apparatus 10 so as to display the desired projected image on face screen 12. Control member 68 in this regard may be provided with mechanical controls for mechanically actuating apparatus 10, or alternatively may be provided with voice recognition capabilities so as to actuate one or more sequences upon recognizing certain tonal or voice patterns. A touch screen control or other command input device may be used to provide interactive use of apparatus 10, and a number of images may be provided for projection under the control of control member 68, for example stored on CD-ROM or any other suitable storage media.

It should be noted that although the present disclosure is made in terms of a projectable image projected on face screen 12 by projector 14, sound is also a component of the desired animation to be provided. Thus, apparatus 10 may also preferably be provided with any conventional sound mechanism, either within or outside of box 28, so as to provide sound along with the animated image from projector 14.

It is important to note that the projectable image may be projected onto face screen 12 either as a front or rear projection within the broad teachings of the invention. It is currently preferred, however, to front project as thoroughly discussed above.

With respect to the embodiment of the invention wherein the character being created is a caricature of an individual or a fictitious character, face screen 12 is preferably provided from any known technique such as sculpting and the like, and the projectable image to be projected thereon is created using any desired animation technique, after which the image is preferably projected for image editing and/or adjustment of stage, projector, environment and camera parameters as set forth above to provide the desired presentation registration. Various imaging techniques can be used to incorporate special effects into the projectable image as desired, and the image can be altered in size and dimension from the original, for example using scanning and 3D modeling tools, to make the image match a face screen 12 of larger or smaller scale, all in accordance with the present invention.

Figure 6:
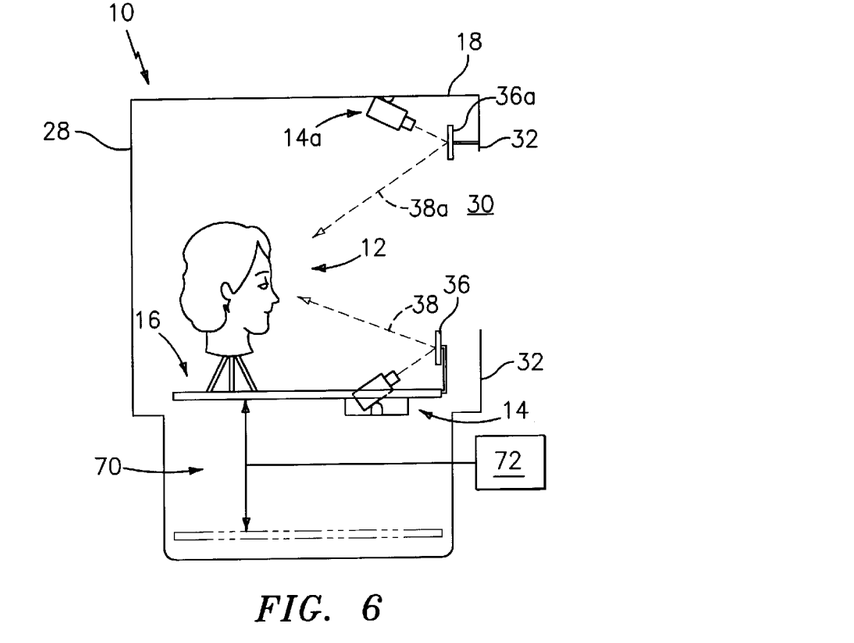
FIG. 6 is a side schematic view illustrating several alternative embodiments of the present invention.

Referring to FIG. 6, several preferred embodiments are illustrated. According to the invention, it is preferred that face screen 12 not be visible when no image is being projected upon it. FIG. 6 illustrates an embodiment wherein face screen 12 is mounted on a lift 70 (shown schematically) in this case acting upon stage assembly 16, for positioning face screen 12 into a hidden position relative to opening 30. Motive means 72 of any suitable type may be provided for operating lift 70, such as a hydraulic or pneumatic drive, electric motor, or any other suitable drive. Thus, advantageously, face screen 12 can be lowered to a position out of view through opening 30 so as to prevent face screen 12 from being seen when no image is projected. Motive means 72 may suitably be linked to control member 68, (not shown in FIG. 6), so as to automatically lower face screen 12 upon deactivating projector 14.

Alternatively, a curtain or other member could be provided and positioned relative to face screen 12 so as to obscure or shield face screen 12 from sight through opening 30. This curtain (not shown) could be provided with a closure mechanism associated with control member 68 for closing the curtain when no image is projected on face screen 12. Still further, the area around face screen 12 could be darkened so as to render face screen 12 substantially invisible when not in use.

FIG. 6 illustrates another distinct alternative embodiment of the present invention wherein a supplemental projector 14*a* is provided and positioned so as to project additional images upon face screen 12. In this way, additional features can be simulated with apparatus 10 according to the invention such as hair or other features of the upper portion of the head, or clothing and other characteristics of the bust and neck area, or other design features. These additional images could preferably be prepared or recorded similarly to the main image to be projected directly onto face screen 12. In the embodiment illustrated in FIG. 6, additional projector 14*a* is positioned for projecting an image of hair and upper head features onto face screen 12 using mirror 36*a* to project along projector path 38*a*.

Figure 7:
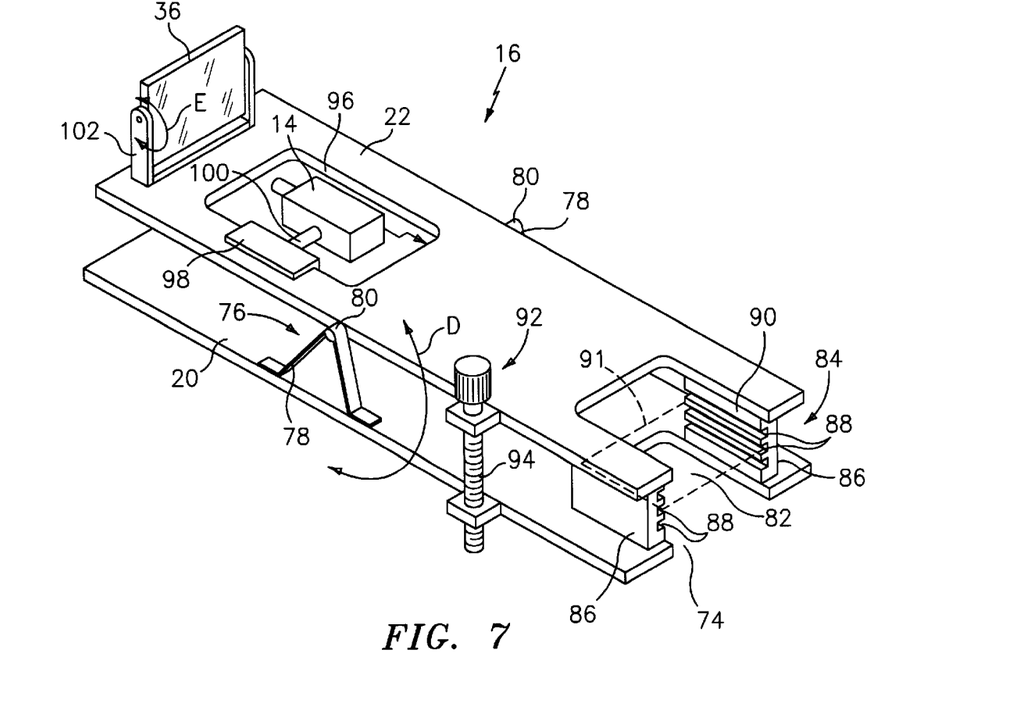
FIG. 7 is a perspective view of a stage assembly according to the invention.

Referring now to FIG. 7, a preferred embodiment of stage assembly 16 is illustrated. As shown, stage assembly 16 may suitably include main stage 20 as a substantially flat platform having a cutout area 74 positioned therein. Face screen stage 22 may also be provided as a substantially flat platform member, and is preferably pivotably mounted to main stage 20, for example though pivot assembly 76 including supports 78 fixed to main stage 20 and pivotably connected to face screen stage 22 at posts 80 as shown. Of course, many other structures for pivotably connecting face screen stage 22 and main stage 20 would be readily apparent.

Face screen stage 22 may preferably be provided with a cutout area 82 preferably substantially aligned with cutout area 74 of main stage 20, and may also be provided with receptacle structure 84 for receiving face screen 12. As shown, receptacle structure 84 preferably includes two opposed arm brackets 86 which may be arranged downwardly extending from stage 22, preferably substantially adjacent to edges of cutout area 82, and slidably extending through cutout area 74.

As shown, arm brackets 86 may be provided with a plurality of substantially parallel grooves 88 arranged on inner surfaces 90 of arm brackets 86 such that grooves 88 are arranged in opposed pairs on arm bracket 88. In this way, each opposed pair of grooves 88 defines a receptacle for receiving a substantially flat base 91 supporting face screen 12, one of which is shown in phantom in FIG. 7, there pairs of opposed grooves 88 are provided, and base 91 is positioned in the middle pair. It should readily be appreciated that the provision of a plurality of opposed pairs as shown allows for vertical adjustment of the position of face screen 12 by mounting base 91 in an appropriate pair of grooves 88. Alternatively, different structures such as a lift or vertically adjustable tripod may be provided for vertical adjustment of face screen 12.

Still referring to FIG. 7, structure 92 is also preferably provided for fixedly positioning stage 22 relative to stage 20, and may for example comprise a threaded member 94 threadably engaged relative to one of stage 20 and stage 22, and mounted for free rotation in a longitudinally fixed location relative to the other of stage 20 and stage 22 whereby rotation of threaded member 94 causes stage 22 to pivot relative to stage 20 as shown by Arrow D in FIG. 7. Of course, any other suitable structure may be provided for fixing stage 20 and stage 22 in a desired pivoted position.

FIG. 7 also shows stage 20 having a projector stage 26 in the form of a bracket 98 mounted to stage 22, and having projector 14 adjustably connected to bracket 98 for example through a universal joint 100. Bracket 98 may suitably be mounted to stage 22 at an edge 96 of a cutout so as to advantageously conserve space in stage assembly 16. In this regard, FIG. 7 also shows mirror 36 mounted in bracket 102 for pivot as shown by Arrow E for adjusting projector path 38 as desired.

Figure 9:
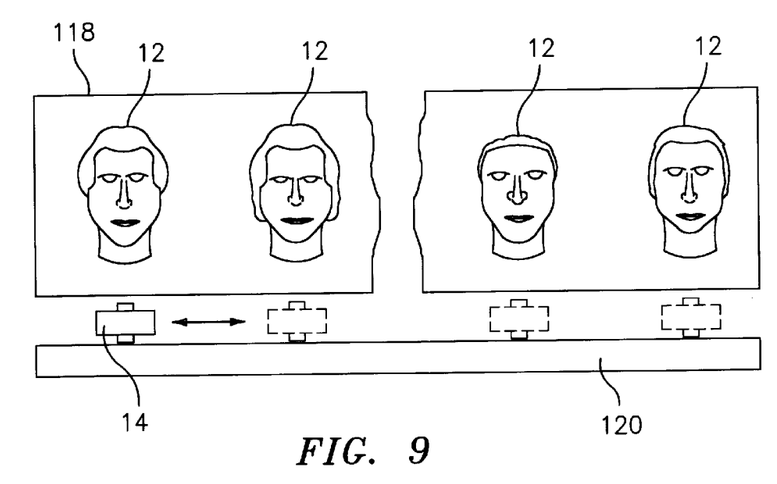
FIG. 9 illustrates a further alternative embodiment utilizing a projector and a plurality of different face screens.

Referring now to FIG. 9, a further alternative embodiment of the present invention is shown wherein box 118 is provided enclosing a plurality of face screens 12, and wherein projector 14 is mounted on a track 120 for movement between a plurality of positions for projecting upon any one of the plurality of face screens 12. Projector 14 is shown in FIG. 9 at the left-most position, and is shown in dashed lines in position for each of the other face screens 12 enclosed within box 118. Thus, in accordance with this embodiment of the invention, a single projector is provided for use with a number of different face screens 12 which can be used advantageously to simulate a number of different characters each forming a portion of a particular display.

It should be noted that any suitable structure according to the invention for enclosing face screens 12 may be provided. Thus, although box 118 is shown schematically as a continuous enclosure, a number of smaller boxes could be provided, if desired, or any other alternative means could be used for darkening the surrounding environment of face screens 12.

Any suitable structure can be provided as track 120, and motive means (not shown) may be provided and controlled so as to position projector 14 at a desired station corresponding to a particular face screen 12 to fit within a particular assembled projectable image or video sequence. It should also be noted that although box 118 is shown with face screens 12 positioned in a horizontal array, the plurality of face screens could be arranged in any different pattern such as a vertical array, or in several rows and columns as desired, with track 120 being positioned accordingly.

In accordance with the foregoing, it should be readily apparent that a process and apparatus for creating extremely life-like animated images has been provided which advantageously overcomes numerous problems experienced in the prior art.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modifications which are within the spirit and scope of the invention as defined by the claims.

What is claimed is:

1. A process for displaying an animated likeness of a face of an individual, comprising the steps of:

providing a face screen comprising a three-dimensional representation of the face of the individual, said face screen having a front surface and a vertical axis;

providing a projector;

positioning said face screen and said projector in an enclosure having a front wall portion with said projector behind said front wall portion and projecting at said face screen so as to define a projector path to said face screen;

making a projectable image of said face of said individual while projecting said projectable image on said front surface of said face screen so as to obtain a desired image registration with said face screen; and projecting said projectable image on said front surface of said face screen at said image registration whereby an animated likeness of said face of said individual is presented.

2. A process according to claim 1, wherein said step of providing said face screen comprises providing said face screen based upon an imprint of the face of the individual.

3. A process according to claim 1, wherein said step of making said projectable image comprises making said image with a camera.

4. A process according to claim 1, wherein said enclosure is an opaque enclosure, whereby the face screen is shielded from potentially interfering light.

5. A process according to claim 1, wherein said making step comprises the step of editing the projectable image so as to adapt the projectable image to the face screen.

6. A process according to claim 1 further comprising the steps of providing a main stage, a face screen stage for supporting the face screen adjustably positioned relative to the main stage, and a projector stage for supporting the projector adjustably positioned relative to the main stage, and wherein said making step includes adjusting the position of at least one of the main stage, face screen stage, and projector stage.

7. A process according to claim 1, further comprising positioning the projector projecting away from said face screen, and positioning at least one reflective element between the projector and the face screen so as to define a reflected optic path from the projector to the face screen.

8. A process according to claim 7, further comprising the step of positioning the reflective element within said enclosure.

9. A process according to claim 1, wherein the step of providing the face screen comprises the steps of forming a cast of the face of the individual, and vacuum forming the face screen from the cast.

10. A process according to claim 9, wherein the step of providing the face screen further comprises applying texturing means to the face screen for simulating human flesh when the image is projected on the face screen.

11. A process according to claim 1, further comprising the steps of positioning an additional screen within the enclosure supplemental to the face screen, and projecting an additional image on the additional screen.

12. A process according to claim 11, wherein the image is projected from a position in front of the face screen and the additional image is projected from a position selected from the group consisting of behind the additional screen, within the additional screen, and combinations thereof.

13. A process according to claim 1, wherein said making step further includes the step of viewing the projectable image on the face screen and applying cosmetics to the individual while viewing the image on the face screen so as to enhance realism of the projected image.

14. A process according to claim 1, further comprising the steps of providing means associated with the face screen for moving the face screen to simulate head movements, and providing the means for moving with commands for moving the face screen in synchronization with the projectable image.

15. A process according to claim 14, wherein the means for moving the face screen comprises means for rotating the face screen and projector around a vertical axis passing through a head perimeter defined by the face screen.

16. A process according to claim 14, wherein the means for moving the face screen comprises means for pivoting the face screen and projector around a horizontal axis defined substantially perpendicular to a path from the projector to the face screen and passing through or directly below a head perimeter defined by the face screen.

17. A process according to claim 1, wherein said making step comprises fixedly associating the image recording means with the face of the character whereby the image recording means remains aligned with the face of the character regardless of movements of the character.

18. A process according to claim 1, wherein said enclosure further comprises sidewalls and a top wall.

19. A system for displaying an animated likeness of a face of an individual, comprising:

a face screen comprising a three-dimensional representation of the face of the individual, said face screen having a front surface;

a projectable image of said face of said individual;

a projector for projecting said projectable image;

an enclosure having a front wall portion, said face screen and said projector being positioned in said enclosure with said projector behind said front wall portion;

said projector being positioned so as to project on said front surface of said face screen along a projector path to said face screen; and means within said enclosure for adjustably mounting said face screen relative to said projector whereby said face screen can be angled relative to said projector.

20. A system according to claim 19, wherein said enclosure further comprises sidewalls and a top wall.

21. An apparatus for displaying an animated likeness of a face of an individual, comprising:

a face screen comprising a three-dimensional representation of the face of the individual, said face screen having a front surface;

a projectable image of said face of said individual;

a projector for projecting said projectable image on said front surface;

an enclosure having an opening and a front wall portion, said face screen and said projector being positioned in said enclosure with said front surface viewable through said opening and said projector behind said front wall portion; and means within said enclosure for adjustably mounting said face screen relative to said projector, said means allowing at least pivot of said face screen relative to said projector around a horizontal axis, whereby said apparatus is a self-contained unit for presenting said image.

22. An apparatus according to claim 21, further comprising a main stage, a face screen stage adjustably mounted to the main stage for supporting the face screen, and a projector stage adjustably mounted to the face screen stage for supporting the projector means.

23. An apparatus according to claim 22, wherein the main stage, face screen stage and projector stage are positioned within the enclosure.

24. An apparatus according to claim 22, further comprising means for moving the main stage in at least one of rotation around a vertical axis and pivot around a horizontal axis whereby the face screen and projector means are moveable with the animated image projected on the face screen.

25. An apparatus according to claim 24, wherein the face screen defines a head perimeter, and wherein the means for moving comprise means for rotating the main stage around a substantially vertical axis passing through the head perimeter of the face screen.

26. An apparatus according to claim 24, wherein the face screen defines a head perimeter, and wherein the means for moving comprises means for pivoting the main stage around a substantially horizontal axis passing through or directly beneath the head perimeter.

27. An apparatus according to claim 22, further comprising first means for pivotably mounting the face screen to the face screen stage, second means for pivotably and vertically movably mounting the projector means to the projector stage, and control means for synchronizing the first means and the second means whereby the projector means is maintained in the presentation registration during pivot of the face screen.

28. An apparatus according to claim 21, further comprising texturing means on the face screen for simulating human flesh when the animated image is projected on the face screen.

29. An apparatus according to claim 21, further comprising an additional screen positioned supplemental to the face screen, and means for providing an additional image on the additional screen.

30. An apparatus according to claim 29, wherein the additional screen is a video monitor.

31. An apparatus according to claim 21, further comprising a control member including a command input device for allowing viewer control of an image to be displayed.

32. An apparatus according to claim 31, wherein the command input device includes means for recognizing sound patterns, whereby the image displayed by the apparatus is voice interactive.

33. An apparatus according to claim 21, wherein said enclosure further comprises sidewalls and a top wall.

* * * * *